United States Patent
Oh et al.

(10) Patent No.: US 7,183,722 B2
(45) Date of Patent: Feb. 27, 2007

(54) APPARATUS AND METHOD OF DRIVING LAMP OF LIQUID CRYSTAL DISPLAY DEVICE

(75) Inventors: Eui Yeol Oh, Yongin-si (KR); Hoon Jang, Siheung-si (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 11/153,006

(22) Filed: Jun. 14, 2005

(65) Prior Publication Data

US 2006/0119294 A1 Jun. 8, 2006

(30) Foreign Application Priority Data

Dec. 4, 2004 (KR) ........................ 10-2004-0101552

(51) Int. Cl.
*H05B 37/02* (2006.01)
*H05B 39/04* (2006.01)
(52) U.S. Cl. ............... 315/210; 315/219; 315/226; 315/254; 315/276; 315/324
(58) Field of Classification Search ............ 315/209 R, 315/210, 211, 212, 217, 224, 225, 246, 250, 315/254, 276, 291, 299, 307, 312, 313, 324, 315/362, 226, 219; 307/17, 38
See application file for complete search history.

(56) References Cited

U.S. PATENT DOCUMENTS

| | | | |
|---|---|---|---|
| 6,232,941 B1 * | 5/2001 | Ode et al. | 345/95 |
| 6,707,264 B2 * | 3/2004 | Lin et al. | 315/307 |
| 6,815,842 B2 * | 11/2004 | Fehd et al. | 307/40 |
| 6,911,790 B2 * | 6/2005 | Wood | 315/291 |

FOREIGN PATENT DOCUMENTS

| | | |
|---|---|---|
| JP | 4-337289 | 11/1992 |
| JP | 2000-69759 | 3/2000 |

* cited by examiner

*Primary Examiner*—Thuy Vinh Tran
(74) *Attorney, Agent, or Firm*—Brinks Hofer Gilson & Lione

(57) ABSTRACT

A lamp driving apparatus of a liquid crystal display device includes m lamp groups in which a plurality of lamps generating light are disposed; n (n<m) inverter parts to generate an AC voltage for driving the lamps; an inverter controller to control the inverter parts; and a multiplexer to selectively supply the AC voltage generated at the n inverter parts to the n lamp groups among the m lamp groups. In each frame, a clock signal is divided into n divided signals. Different sets of lamp groups are driven during each of the divided signals.

27 Claims, 10 Drawing Sheets

APPARATUS AND METHOD OF DRIVING LAMP OF LIQUID CRYSTAL DISPLAY DEVICE

This application claims the benefit of the Korean Patent Application No. P2004-101552 filed on Dec. 4, 2004, which is hereby incorporated by reference.

FIELD OF THE INVENTION

The present invention relates to a lamp driving apparatus of a liquid crystal display device, and more particularly to a lamp driving apparatus and method of a liquid crystal display device that is adaptive for reducing cost.

DESCRIPTION OF THE RELATED ART

Generally, a liquid crystal display device s being used in an increasing number of applications as it is light, thin, and has low driving power consumption. These applications include office automation equipment, audio/video equipment and so on. The liquid crystal display device controls the transmitted amount of light in accordance with a video signal applied to a plurality of control switches which are arranged in a matrix, thereby displaying a desired picture on a screen.

In this way, the liquid crystal display device is not a self luminous display device, thus it requires a light source such as a backlight. A cold cathode fluorescent tube (hereinafter, referred to as "CCFT") is used as the light source in the backlight.

The CCFL is a light source tube that generates light through cold emission-electron emission generated because a strong electric field is applied to a cathode surface—so that it has low heat generation, high brightness, long life span, full color and so on. Different types of CCFLs include a light guide type, a direct light type and a reflector type. An appropriate type of light source tube is selected dependent on the requirements of the liquid crystal display device.

In this way, the CCFL uses an inverter circuit for obtaining a high voltage power source from a DC power source of low voltage.

FIG. 1 is a diagram representing a lamp driving apparatus of a liquid crystal display device of the prior art. FIG. 2 is a diagram representing an inverter part shown in FIG. 1.

Referring to FIGS. 1 and 2, a lamp driving apparatus of the liquid crystal display device according to the prior art includes a plurality of lamp groups 7 formed with a plurality of lamps 6 which generate light; a plurality of inverter parts 4 to drive the lamps 6 by supplying an AC voltage of high voltage to the lamps 6; and an inverter controller 2 to control the inverter part 4.

Each of the lamp groups 7 is composed of at least two lamps 6, and each of the lamps 6 receives a lamp output voltage from the inverter 8 to produce visible light. Each of the lamps 6 is composed of a glass tube and an inert gas inside the glass tube, wherein the inert gas is charged in the glass tube and phosphorus is spread over the inner wall of the glass tube.

Each of the inverter parts 4 is connected to each lamp of the associated lamp group 7, is driven by an enable signal ENA supplied from the inverter controller 2, drives the lamp 6 using of a clock signal CLK and a drive power source VCC supplied from the inverter controller 2, and transmits to the inverter controller 2 a state signal ACK that is generated when a problem exists in the lamp 6. Accordingly, if the state signal ACK is supplied to the inverter controller 2, the inverter controller 2 stops the drive of the inverter part 4 when something is wrong in the lamp 6. Each of the inverter parts 4 includes a transformer 18 for supplying a high voltage to the lamp 6, a switch device part 16 for supplying a DC power source VDD supplied from the outside to the transformer 18 in accordance with the output value of the inverter 8.

The transformer 18 includes a primary winding Ti1 connected to the switch device part 16 and a secondary winding T2 connected to the lamp 6. Both ends of the primary winding T1 are connected to the switch device part 16. One end of the secondary winding T2 is connected to one side of the lamp 6, and the other end is connected to a feedback circuit 14. The voltage supplied from the switch device part 16 is converted into an AC voltage of high voltage by a winding ratio between the primary winding T1 and the secondary winding T2 of the transformer 18.

The inverter 8 generates drive signals PDR1, NDR1, PDR2, NDR2 to drive the switch device part 16 by use of the clock signal CLK and the drive power source VCC supplied from the inverter controller 2. The inverter 8 includes a drive signal generator 10 to drive the switch device part 16, a feedback circuit 14 connected to the transformer 18 to detect the output voltage of the transformer 18, and a switch controller 12 to generate a control signal SCS for controlling the switch device part 16 on the basis of the feedback signal FB from the feedback circuit 14.

The feedback circuit 14 generates the feedback signal FB corresponding to the AC voltage of high voltage supplied from the other end of the secondary winding T2 of the transformer 18 to supply it to the switch controller 12.

The switch controller 12 generates a switching control signal SCS controlling the switching of the switch device part 16 in accordance with the feedback signal FB from the feedback signal 14.

The drive signal generator 10 generates the drive signal PDR1, NDR1, PDR2, NDR2 for driving the switch device part 16 in accordance with the drive power source VCC supplied from the inverter controller 2 and the switching control signal SCS supplied from the switch controller 12, to supply them to the switch device part 16.

The switch device part 16 is driven in accordance with the drive signals PDR1, NDR1, PDR2, PDR2 supplied from the drive signal generator 10 to supply the DC voltage VDD supplied from the outside to the primary winding T1 of the transformer 18. The switch device part 16 includes a first switch device part 16A for supplying a positive (+) DC voltage to the primary winding T1 of the transformer 18 and a second switch device part 16B for supplying a negative (−) DC voltage to the primary winding T1 of the transformer 18.

The first switch device part 16A supplies the positive (+) DC voltage VDD to both ends (between A and B) of the primary winding 1 of the transformer 18. The first switch device part 16A includes a first switch device Q1 installed at one side of the primary winding T1 of the transformer 18 and the DC power source VDD to be driven by the first drive signal PDR1 supplied from the drive signal generator 10; and a second switch device Q2 installed between a ground voltage source GND and one side of the primary winding T1 of the transformer 18 to be driven by the second drive signal NDR1 supplied from the drive signal generator 10. The first switch device Q1 is a P type transistor (MOSFET or BJT) and the second switch device Q2 is an N type transistor (MOSFET or BJT).

The second switch device part 16B supplies the negative (−) DC voltage VDD to both ends (between A and B) of the primary winding T1 of the transformer 18. The second switch device part 16B includes a third switch device Q3 installed at the other side of the primary winding T1 of the transformer 18 and the DC power source VDD to be driven by the third drive signal PDR2 supplied from the drive signal generator 10; and a fourth switch device Q4 installed between a ground voltage source GND and the other side of the primary winding T1 of the transformer 18 to be driven by the fourth drive signal NDR2 supplied from the drive signal generator 10. The third switch device Q3 is a P type transistor (MOSFET or BJT) and the second switch device Q4 is an N type transistor (MOSFET or BJT).

The inverter controller 2 receives a polarity control signal POL for controlling the polarity of a dimming signal and an inverter selection signal SEL from a system (not shown) and supplies to the inverter part 4 the dimming signal L1 to Lm for controlling the brightness of light generated from the lamp 6, an enable signal ENA for driving the inverter part 4, and a clock signal CLK and the drive power source VCC for generating the drive signal PDR1, NDR1, PDR2, NDR2. The inverter controller 2 intercepts the drive of the inverter part 4 when something is wrong in the lamp 6 when the state signal ACK is supplied from the inverter part 4.

However, the lamp driving apparatus of the liquid crystal display device of the prior art has m (m is an integer) lamp groups 7 each connected to m of the inverter parts 4 and each driven by the AC voltage of high voltage supplied from the m inverter parts 4. The large number of the inverter parts 4 increases the cost of the liquid crystal display device.

SUMMARY OF THE INVENTION

By way of introduction only, in one embodiment, a lamp driving apparatus of a liquid crystal display device, comprises: m (m is an integer of at least 2) lamp groups each having a plurality of lamps; n (n is an integer smaller than m) inverter parts to generate an AC voltage of high voltage for driving the lamps; an inverter controller to control the inverter parts; and a multiplexer to selectively supply the AC voltage of high voltage generated at the n inverter parts to the n lamp groups among the m lamp groups.

In another embodiment, a method for driving a lamp display device having m (m is an integer of at least 2) lamp groups in each of which at least two lamps are disposed and n (n is an integer smaller than m) inverter parts to generate a drive voltage for driving the lamps is presented. The method comprises: generating n drive voltages for driving the lamps; dividing a clock signal into m divided signals; and selectively supplying the n drive voltages to n lamp groups for one frame using the m divided signals.

In another embodiment, a lamp driving apparatus comprises: m (m>1) lamp groups each containing a plurality of lamps; n inverter parts ($1 \leq n < m$) that each generate an AC voltage sufficient to drive the lamps of at least one of the lamp groups, fewer inverter parts being disposed in the lamp driving apparatus than lamp groups; an inverter controller that controls the inverter parts; and a multiplexer that selects different sets of lamp groups to be driven such that all of the lamp groups are driven for at least a portion of each frame.

BRIEF DESCRIPTION OF THE DRAWINGS

The invention will be apparent from the following detailed description of the embodiments of the present invention with reference to the accompanying drawings, in which.

DETAILED DESCRIPTION OF THE PREFERRED EMBODIMENT

Reference will now be made in detail to the preferred embodiments of the present invention, examples of which are illustrated in the accompanying drawings.

Hereinafter, the preferred embodiments of the present invention will be described in detail with reference to FIGS. 3 to 15.

Figure 3:
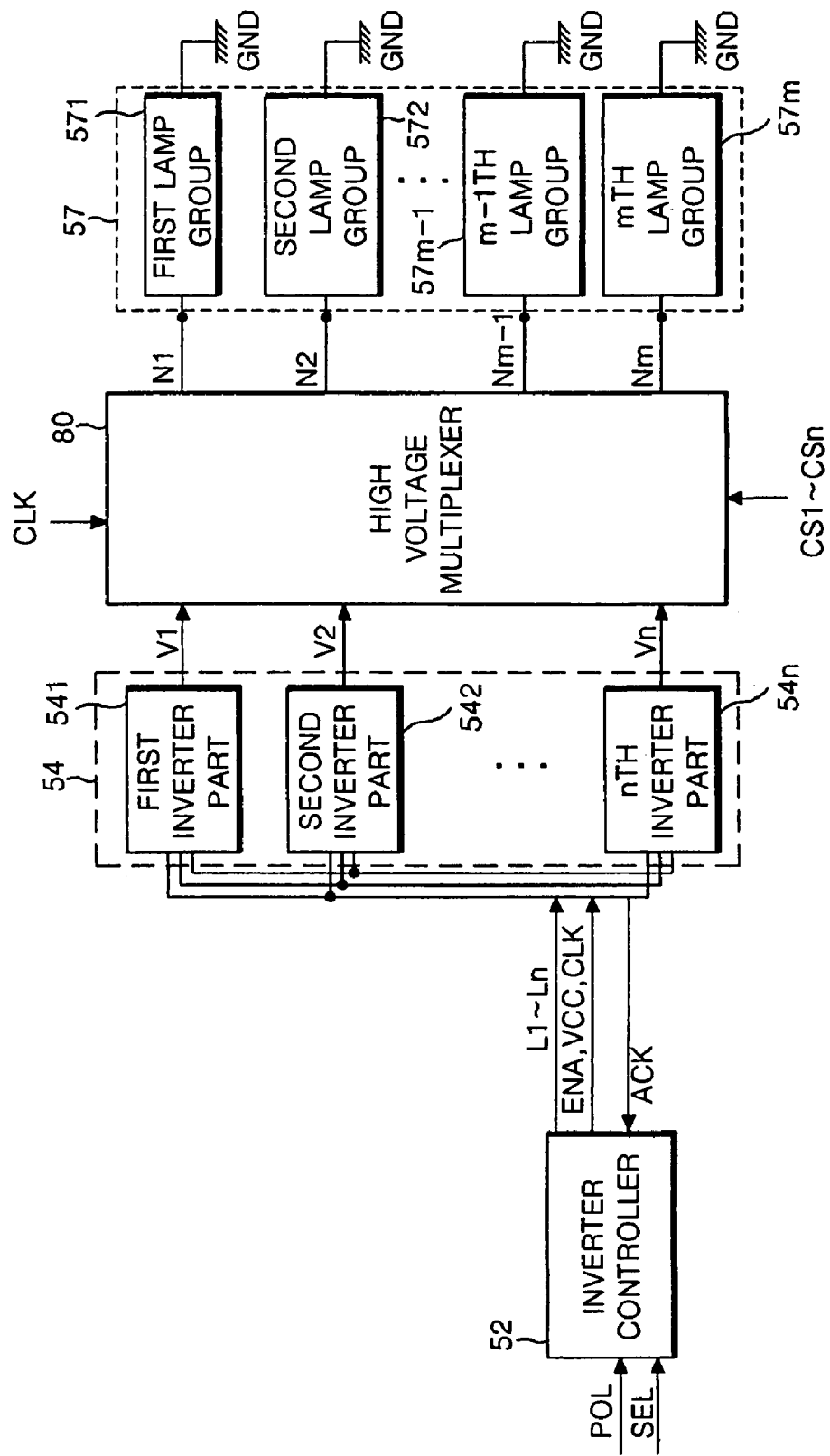
FIG. 3 is a diagram representing a lamp driving apparatus of a liquid crystal display device according to an embodiment of the present invention.

FIG. 3 is a diagram representing a lamp driving apparatus of a liquid crystal display device according to an embodiment of the present invention.

Referring to FIG. 3, the liquid crystal display device according to an embodiment of the present invention includes a plurality of lamp groups 57 where a plurality of lamps that generate light are formed; a plurality of inverter parts 54 to generate an AC voltage of high voltage which is required for driving the lamps; an inverter controller 52 to control the inverter parts 54; and a high voltage multiplexer 80 for supplying the AC voltage of high voltage generated in the inverter parts 54 to the lamp groups 57 which are driven among the lamp groups.

Figure 1:
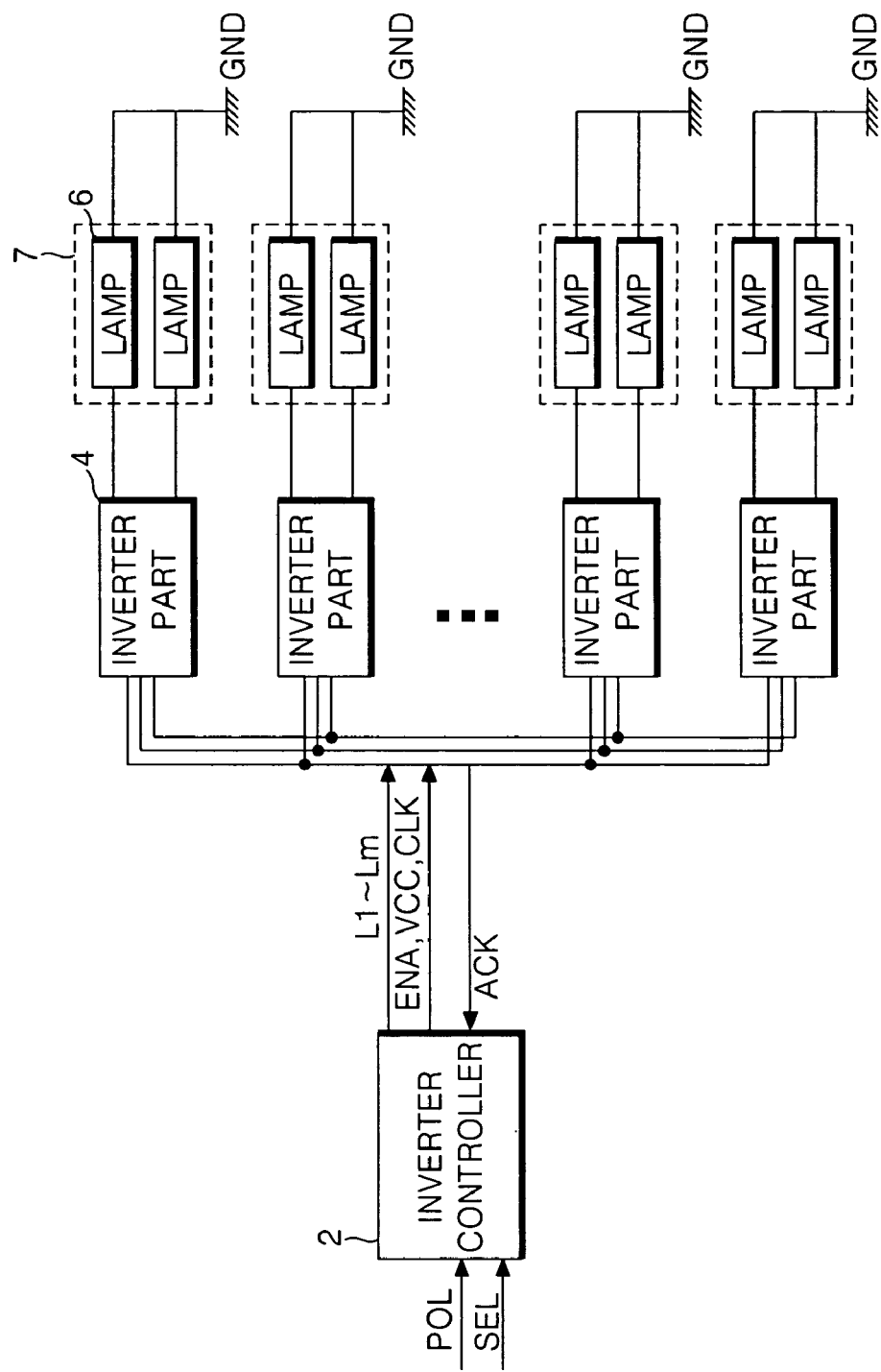
FIG. 1 a diagram representing a lamp driving apparatus of a liquid crystal display device of the prior art.
Figure 2:
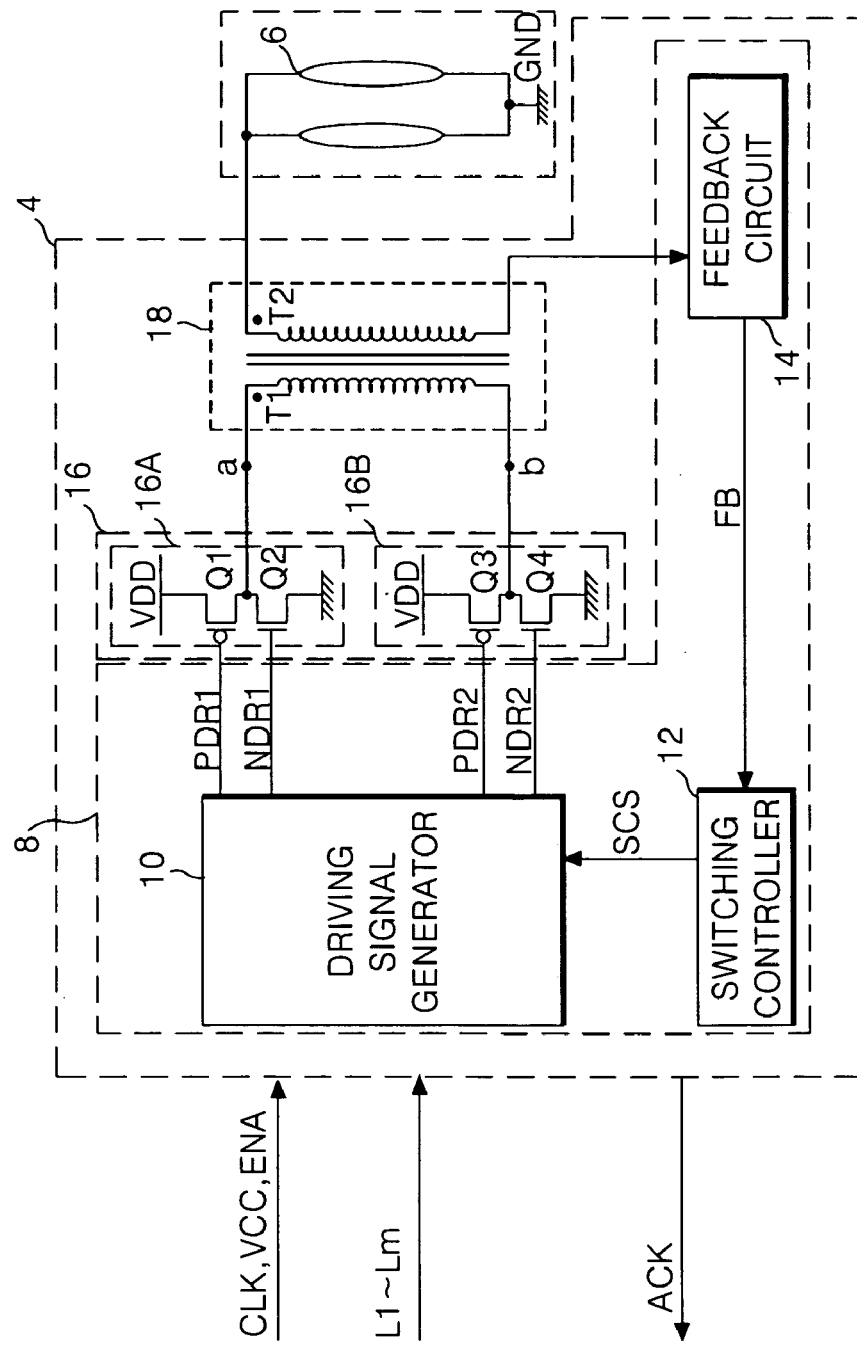
FIG. 2 is a diagram representing an inverter part shown in FIG. 1.

The lamp group 57, as shown in FIG. 2, is composed of at least two lamps 6, each of which irradiates a liquid crystal display panel (not shown) with visible light using the AC voltage of high voltage supplied through the high voltage multiplexer 80. Each of the lamps 6 includes a glass tube and invert gas inside the glass tube, and the inert gas is charged into the glass tube and phosphorus is spread over the inner wall of the glass tube. Each of the lamps 6 has electrons emitted to collide with the inert gas within the glass tube to increase the amount of electrons in geometrical progression when the AC voltage of high voltage generated in the inverter part 54 is supplied to a high voltage electrode by the high voltage multiplexer 80. The increased electrons make an electric current flow in the inside of the glass tube, thus the inert gas Ar, Ne becomes excited by the electrons to generate energy and the generated energy excites mercury to emit ultraviolet radiation. The ultraviolet radiation collides with the luminous phosphorus spread over the inner wall of the glass tube, thereby emitting visible radiation.

Each of the inverter parts 54, as shown in FIG. 2, is driven by an enable signal ENA supplied from the inverter controller 52, and generates an AC voltage of high voltage required for driving the lamp by use of a drive power source VCC and a clock signal CLK supplied from the inverter controller 52 and transmits a state signal ACK to the inverter controller 52 in accordance with the presence or absence of a problem with the lamp 6. Accordingly, the inverter controller controls the drive of the inverter part 54 in accordance with the state of the lamp 6 when the state signal ACK is supplied to the inverter controller 52. Each of the inverter parts 54 includes a transformer 18 to generate an AC voltage of high voltage which drives the lamp 6, a switch device part 16 to supply a DC power source VDD to the transformer 18 in accordance with the output signal of the inverter 8, and an inverter 8 for driving the switch device part 16.

The transformer 18 includes a primary winding T1 connected to the switch device part 16 and a secondary winding T2 connected to the high voltage multiplexer 80. Both ends of the primary winding T1 are connected to the switch device part 16, and one end of the secondary winding T2 is connected to the high voltage multiplexer 80 and the other end is connected to a feedback circuit 14. The voltage supplied from the switch device part 16 is converted into the AC voltage of high voltage by the winding ratio between the primary winding T1 and the secondary winding T2 and induced to the secondary winding T2 of the transformer 18. At this moment, the AC voltage of high voltage induced to the secondary winding T2 of the transformer 18 is supplied to the high voltage multiplexer 80 and the high voltage multiplexer 80 supplies the AC voltage of high voltage in accordance with a clock signal CLK supplied from the inverter controller 52, to n (n is an integer smaller than m) lamp groups 57<sub>1</sub> to 57<sub>n</sub> among m lamps 57<sub>1</sub> to 57<sub>m</sub>.

The inverter 8 generates drive signals PDR1, NDR1, PDR2, NDR2 for driving a switch device part 16 by use of the drive power source VCC and the clock signal CLK supplied from the inverter controller 52. The inverter 8 includes a drive signal generator 10 for driving a switch device part 16, a feedback circuit 14 connected to the transformer 18 to detect the output voltage of the transformer 18, and a switch controller 12 to generate a control signal SCS for controlling the drive of the switch device part 16 on the basis of a feedback signal FB from the feedback circuit 14.

The feedback circuit 14 generates the feedback signal FB corresponding to the AC voltage of high voltage supplied from the other end of the secondary winding T2 of the transformer 18 to supply it to the switch controller 12.

The switch controller 12 generates a switching control signal SCS in accordance with the feedback signal FB from the feedback circuit 14. The generated switching control signal SCS is supplied to the drive signal generator 10

Figure 5:
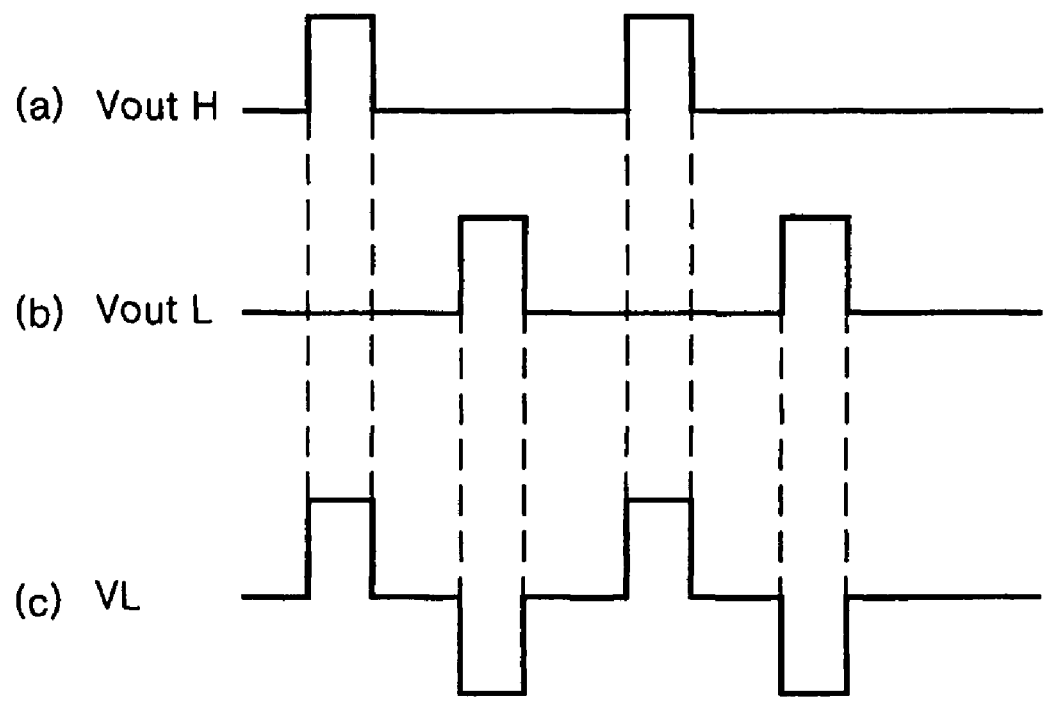
FIG. 5 is a diagram representing a voltage supplied to a primary winding of a transformer by a drive signal shown in FIG. 4.

The drive signal generator 10 generates the drive signal PDR1, NDR1, PDR2, NDR2 for driving the switch device part 16 in accordance with the switching control signal SCS supplied from the switch control part 12 and the drive power source VCC supplied from the inverter controller 52, to supply it to the switch device part 16. The drive signal PDR1, NDR1, PDR2, NDR2 supplied from the drive signal generator 10 to the switch device part 16 is the same as shown in FIG. 5.

The switch device part 16 is driven in accordance with the drive signal PDR1, NDR1, PDR2, NDR2 supplied to the drive signal generator 10 to supply the DC power source VDD to the primary winding T1 of the transformer 18. The switch device part 16 includes a first switch device part 16A for supplying a positive (+) DC voltage to the primary winding T1 of the transformer 18 and a second switch device part 16B for supplying a negative (−) DC voltage to the primary winding T1 of the transformer 18.

Figure 4:
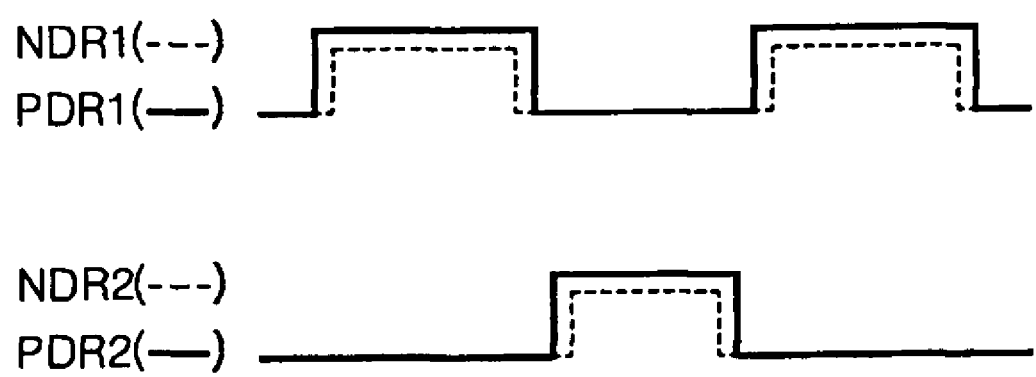
FIG. 4 is a diagram representing drive signals supplied to a switching device part shown in FIG. 1.

The first switch device part 16A supplies the positive (+) DC voltage VDD to both ends (between A and B) of the primary winding T1 of the transformer 18. The first switch device part 16A includes a first switch device Q1 installed at one side of the primary winding T1 of the transformer 18 and the DC power source VDD to be driven by the first drive signal PDR1 supplied from the drive signal generator 10; and a second switch device Q2 installed between a ground voltage source GND and one side of the primary winding T1 of the transformer 18 to be driven by the second drive signal NDR1 supplied from the drive signal generator 10. The first switch device Q1 is a P type transistor (MOSFET or BJT) and the second switch device Q2 is an N type transistor (MOSFET or BJT). The first and second switch devices Q1, Q2, if the first and second drive signal PDR1, NDR1 shown in FIG. 4 are supplied, supplies the DC voltage VDD to one side of the primary winding T1 of the transformer 18 if the first and second drive signal PDR1, NDR1 are in a low state. Accordingly, a first DC voltage VoutH is supplied to one side of the primary winding T1 of the transformer 18 as shown in FIG. 5(a). However, the voltage is not supplied to the one side of the primary winding T1 of the transformer 18 if the first and second drive signal PDR1, NDR1 are in a high state.

The second switch device part 16B supplies the negative (−) DC voltage VDD to both ends (between A and B) of the primary winding T1 of the transformer 18. The second switch device part 16B includes a third switch device Q3 installed at the other side of the primary winding T1 of the transformer 18 and the DC power source VDD to be driven by the third drive signal PDR2 supplied from the drive signal generator 10; and a fourth switch device Q4 installed between a ground voltage source GND and the other side of the primary winding T1 of the transformer 18 to be driven by the fourth drive signal NDR2 supplied from the drive signal generator 10. At this moment, the third switch device Q3 is a P type transistor (MOSFET or BJT) and the second switch device Q4 is an N type transistor (MOSFET or BJT). The third and fourth switch devices Q3, Q4, if the third and fourth drive signal PDR2, NDR2 shown in FIG. 4 are supplied, supplies the DC voltage VDD to the other side of the primary winding T1 of the transformer 18 if the third and fourth drive signal PDR2, NDR2 are in a low state. Accordingly, a second DC voltage VoutL is supplied to the other side of the primary winding T1 of the transformer 18 as shown in FIG. 5(b). However, the voltage is not supplied to the other side of the primary winding T1 of the transformer 18 if the third and fourth drive signal PDR2, NDR2 are in a high state.

A tank voltage as of FIG. 5(c) is generated at both ends (between a and b) of the first winding T1 of the transformer 18 by the drive of the first and second switch drivers 16A and 16B. Because of this, the pyramidal wave current is induced to the primary winding T1 of the transformer 18 as shown in FIG. 4.

The inverter controller 52 receives a polarity control signal POL for controlling the polarity of a dimming signal and an inverter selection signal SEL from a system (not shown) and supplies to the inverter part 54 the dimming signal L1 to Lm for controlling the brightness of light generated from the lamp 6, an enable signal ENA for driving the inverter part 54, and a clock signal CLK and the drive power source VCC for generating the drive signal PDR1, NDR1, PDR2, NDR2. The inverter controller 52 intercepts the drive of the inverter part 54 when something is wrong in the lamp 6 when the state signal ACK is supplied from the inverter part 54.

Figure 6:
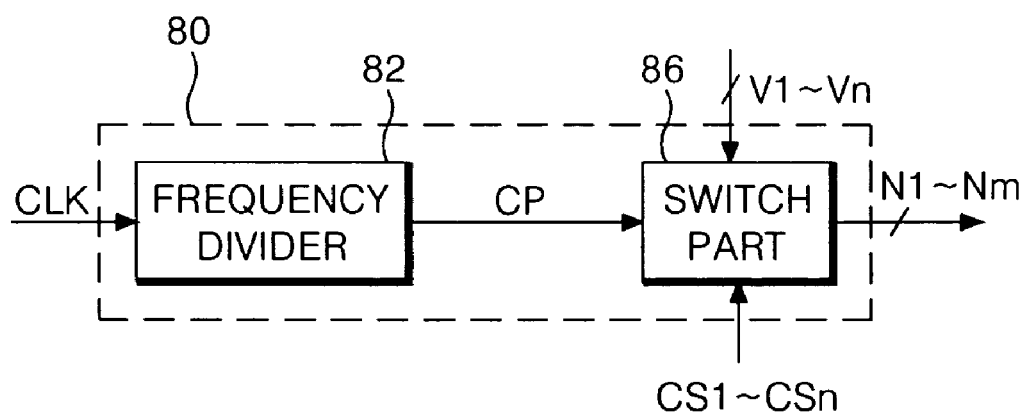
FIG. 6 is a diagram representing a high voltage multiplexer shown in FIG. 3.

The high voltage multiplexer 80 supplies the AC voltage of high voltage generated at the inverter part 54 in accordance with the clock signal supplied from the inverter controller 52, to n (n is an integer smaller than m) lamp groups 571 to 57n among m (m is an integer of 2 or above) lamp groups 57. High voltage multiplexer 80, as shown in FIG. 6, includes a frequency divider 82 to divide the clock signal CLK supplied from the inverter controller 52; and a switch part 86 to supply the AC voltage of high voltage generated at the n inverters 54 in accordance with a division signal CP from the frequency divider 82 the control signal CS1 to CSn to the n (n is an integer smaller than m) lamp groups 571 to 57n among the m lamp groups 571 to 57m.

Figure 7:
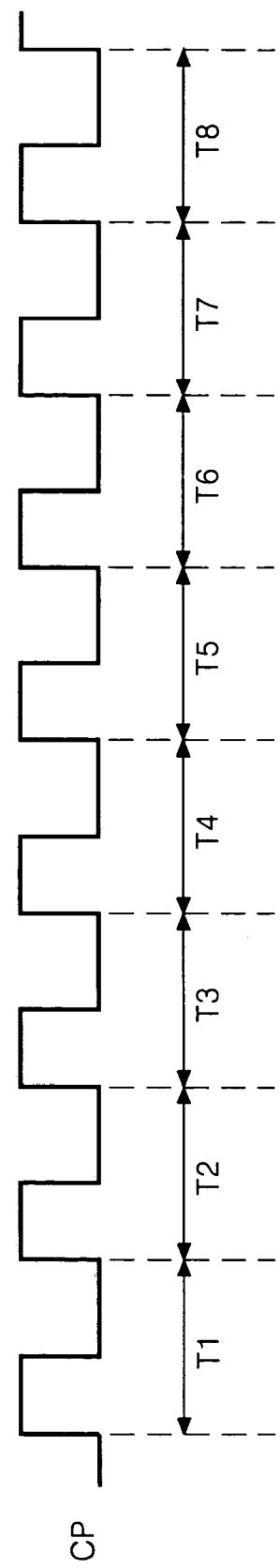
FIG. 7 is a diagram representing that a frequency is divided by a frequency divider shown in FIG. 6.

The frequency divider 82 divides the clock signal CLK supplied from the inverter controller 52 into m division signals to supply the division signal to the switch part 86. For example, if the lamp driving apparatus of the liquid crystal display device of the present invention has five inverter parts 541 to 545 and eight lamp groups 571 to 578, as shown in FIG. 7, the frequency divider 82 divides into eight the clock signal CLK inputted from the inverter controller 52. The division signal CP from the frequency divider 82 is used as the clock signal of the switch part 86.

Figure 8:
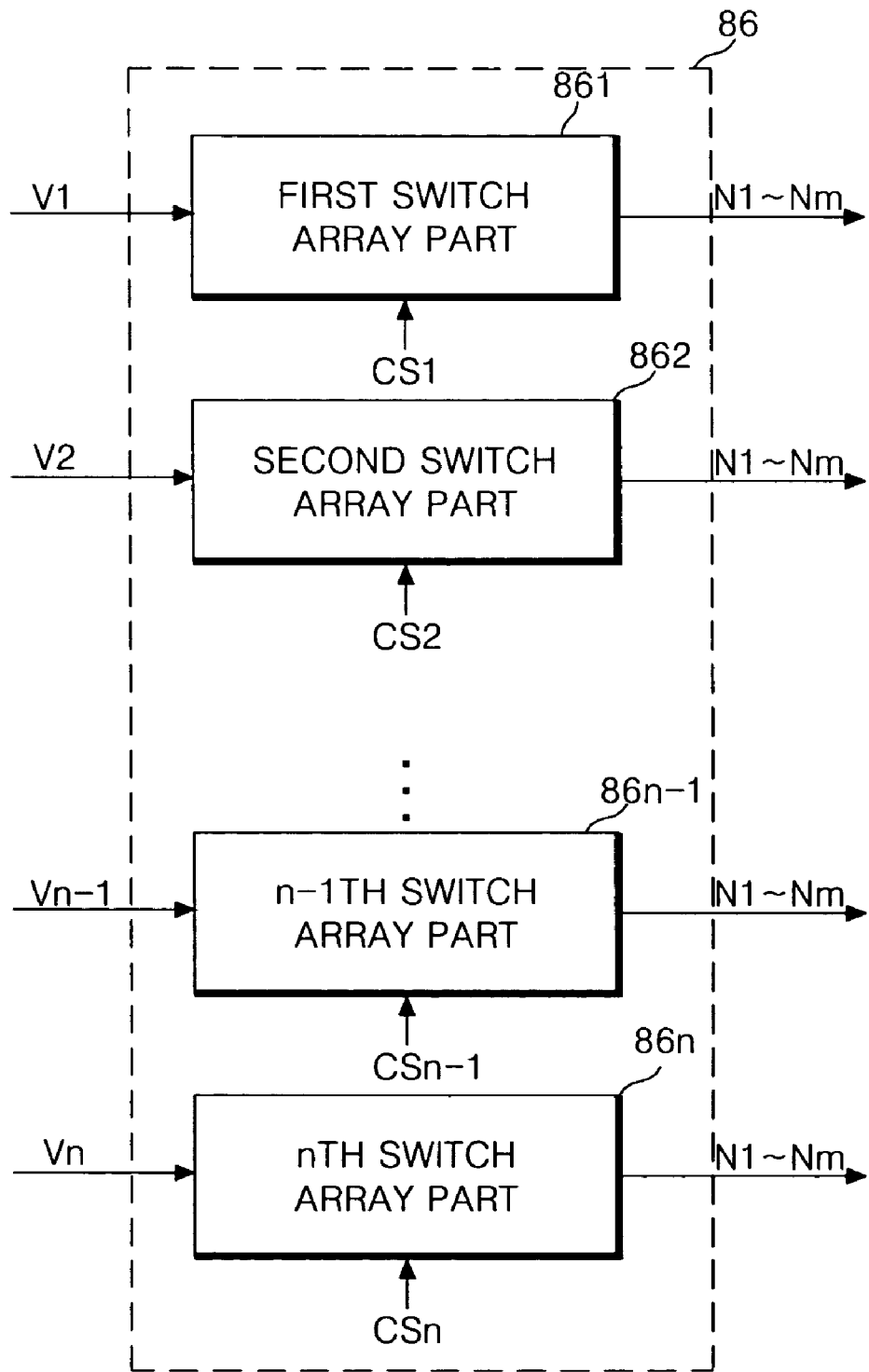
FIG. 8 is a diagram representing a switch part shown in FIG. 6.
Figure 9:
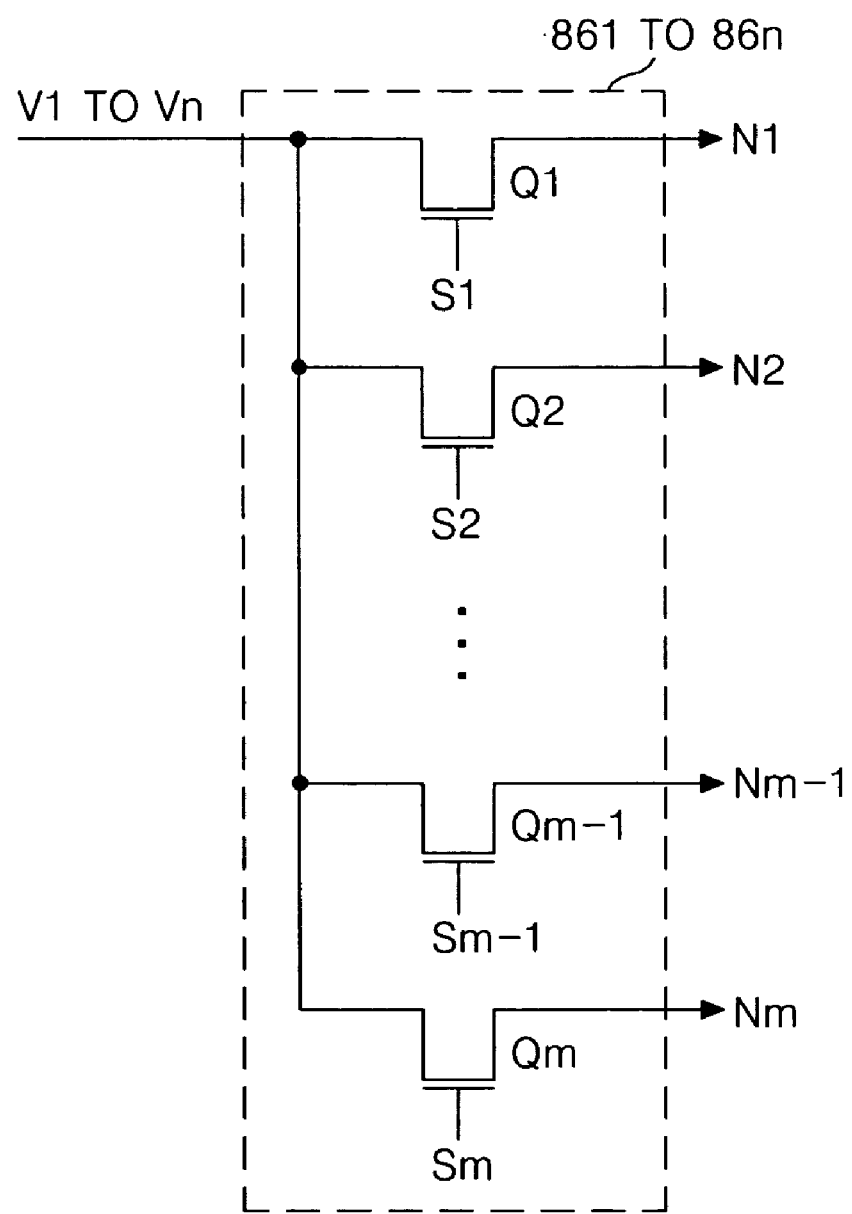
FIG. 9 is a diagram representing a switch array part shown in FIG. 7.

The switch part 86 supplies the AC voltage of high voltage generated at the n inverters 54 by being switched by the switching control signals CS1 to CSn supplied from the switch part 86, to the n (n is an integer smaller than m) the lamp groups 571 to 57n among the m lamp groups 571 to 57m. The switch part 86, as shown in FIG. 8, includes the n switch array parts 861 to 86n so that the AC voltage of high voltage generated at the n inverter part 54 is supplied to the n (n is an integer smaller than m) lamp groups 571 to 57n among the m lamp groups 571 to 57m in accordance with the switching control signals CS1 to CSn supplied from the switch part 86. In other words, the liquid crystal display device of the present invention includes five inverter parts 541 to 545, the switch part 86 includes five switch array parts 861 to 865. Each of the switch array parts 861 to 86n, as shown in FIG. 9, has m switches Q1 to Qm each connect any one among the first to $n^{th}$ inverter parts 541 to 54n with m nodes N1 to Nm between the first to $m^{th}$ lamp groups 571 to 57m. Each of the m switches Q1 to Qm is turned on or off in accordance with the state value S1 to Sm of each switching control signal CS1 to CSn. Because of this, each of the switch array parts 861 to 86n selectively supplies the AC voltage of high voltage generated in any one of the first to nth inverter parts 541 to 54n to any one of the first to $m^{th}$ lamp group 571 to 57m in accordance with the switching control signal CS1 to CSn. Each of the switches Q1 to Qm is a semiconductor switching device, e.g., a MOSFET, IGBT, SCR or BJT.

The lamp driving method of the liquid crystal display device according to the embodiment of the present invention, is described as follows. Herein, it will be described assuming that the liquid crystal display device of the present invention has the five inverter parts 541 to 545 and the eight lamp groups 571 to 578, and the AC voltages of high voltage generated at the first to fifth inverter parts 541 to 545 are each supplied to the first to fifth lamp groups 571 to 575 in T1 period of the division signal CP shown in FIG. 7.

Figure 10:
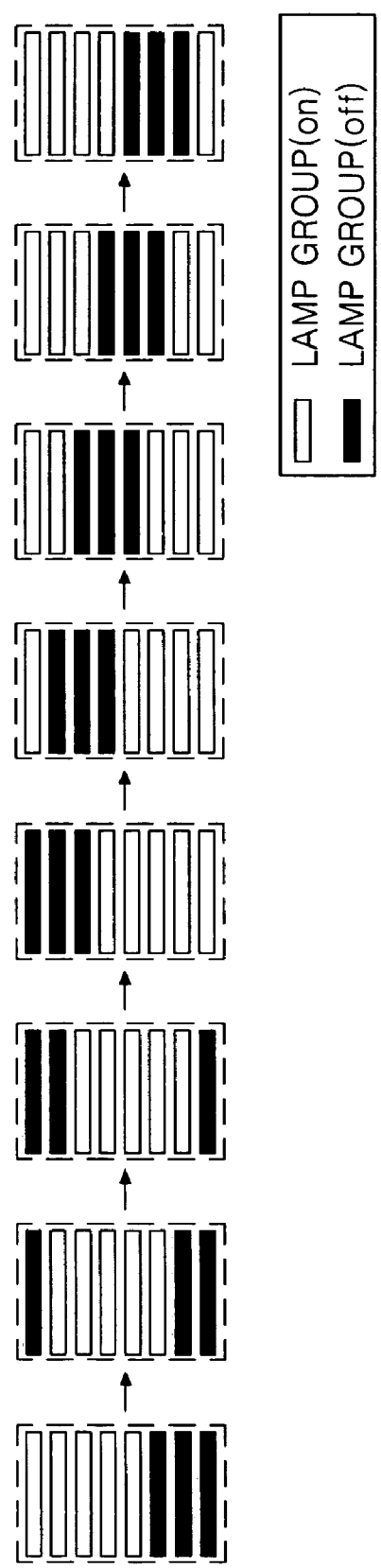
FIG. 10 is a diagram representing a method that a lamp group is driven by the lamp driving apparatus of the liquid crystal display device shown in FIG. 3.

By the division signal CP from the frequency divider 82 and the control signal CS1 to CSn from the inverter controller 52, '10000000' is stored at the first switch array part 861, '01000000' is stored at the second switch array part 862 and '00100000' is stored at the third switch array part 863. Further, '00010000' is stored at the fourth switch array part 864 and '00001000' is stored at the fifth switch array part 865. Herein, in case that the liquid crystal display device is driven at 60 Hz, one frame is $\frac{1}{60}$ second (16.7 ms), thus one period of the division signal CP is set to be about 2.08 ms for driving eight lamp groups 571 to 578 for one frame period. Accordingly, the division signal CP of the T1 period shown in FIG. 7 is supplied to the switch part 86, i.e., the switching control signals CS1 to CS5, are supplied to the first to eighth switches Q1 to Q8 of each of the first to fifth switch array parts 861 to 865. In the first switch array part 861, only the first switch Q1 is turned on by the first switching control signal CS1 to supply the AC voltage of high voltage V1 generated at the first inverter part 541 to the first lamp group 571. The second to eighth switches Q2 to Q8 of the first switch array part 861 remain in the off state. Further, in the second switch array part 862, only the second switch Q2 is turned on by the second switching control signal CS2 to supply the AC voltage of high voltage V2 generated at the second inverter part 542 to the second lamp group 572. The first switch Q1 and the third to eighth switches Q3 to Q8 of the second switch array part 862 remain in the off state. And, in the third to fifth switch array parts 863 to 865, only the third to fifth switches Q3 to Q5 are turned on by the third to fifth switching control signals CS3 to CS5 to supply the AC voltage of high voltage generated at the third to fifth inverter parts 543 to 545 to the third to fifth lamp groups 573 to 575. The rest of the switches of the third to fifth switch array parts 863 to 865 remain in the off state. Accordingly, if the division signal CP of T1 period is supplied to the switch part 86, as shown in FIG. 10, only the first to fifth lamp groups 571 to 575 are turned on among the eight lamp groups 571 to 578.

The division signal CP of T2 period and the switching control signal CS1 to CS5 are thus supplied to the first to eighth switches Q1 to Q8 of the first to fifth switch array parts 861 to 865.

Accordingly, in the first switch array part 861, the first switch Q1 is turned off, the second switch Q2 is turned on and the rest of the switches Q3 to Q8 remain in the previous off state. Further, in the second switch array part 862, the second switch Q2 is turned off, the third switch Q3 is turned on and the rest of the switches Q1 and Q4 to Q8 remain in the previous off state. And, in the third to fifth switch array parts 863 to 865, the third to fifth switches Q3 to Q5, which were turned on in the T1 period, are turned off, the fourth to sixth switches Q4 to Q6 are turned on and the rest of the switches remain in the previous off state. Accordingly, in the T2 period, the AC voltage of high voltage V1 to V5 generated at the first to fifth inverter parts 541 to 545 are each supplied to the second to sixth lamp groups 571 to 575. Because of this, the second to sixth lamp groups 571 to 575 are turned on in the T2 period of the division signal CP. And then, in the driving method of the T3 to T8 periods, as described in the T1 and T2, the switches Q1 to Q8 of the first to fifth switch array parts 861 to 865 in accordance with the division signal CP and the switching control signal CS1 to CS5, sequentially turned on to supply the AC voltage of high voltage generated at the first to fifth inverter parts 541 to 545 to the five lamp groups among the eight lamp groups 571 to 578. In other words, in the T3 period of the division signal CP, the AC voltage of high voltage generated at the first to fifth inverter parts 541 to 545 is supplied to each of the third to seventh lamp groups 573 to 577. In the T4 period of the division signal CP, the AC voltage of high voltage generated at the first to fifth inverter parts 541 to 545 is supplied to each of the fourth to eighth lamp groups 574 to 578. In the T5 period of the division signal CP, the AC voltage of high voltage generated at the first to fifth inverter parts 541 to 545 is supplied to each of the fifth to eighth lamp groups 575 to 578 and the first lamp groups 571. In the T6 period of the division signal CP, the AC voltage of high voltage generated at the first to fifth inverter parts 541 to 545 is supplied to each of the sixth to eighth lamp groups 576 to 578 and the first to second lamp groups 571, 572. In the T7 period of the division signal CP, the AC voltage of high voltage generated at the first to fifth inverter parts 541 to 545 is supplied to each of the seventh to eighth lamp groups 577 to 578 and the first to third lamp groups 571 to 573. In the T8 period of the division signal CP, the AC voltage of high voltage generated at the first to fifth inverter parts 541 to 545 is supplied to each of the eighth lamp groups 578 and the first to fourth lamp groups 571 to 574. Because of this, eight lamp groups 571 to 578 are turned on for one frame in the order shown in FIG. 14. After this, the drive from the T1 period to the T8 period repeats.

Only the driving method of the five inverter parts 541 to 545 and the eight lamp groups 571 to 578 are explained in the above, but the number of the inverter parts 54 and the lamp groups 57 can be changed as desired. That is, if the size of the liquid crystal display device becomes bigger, and the number of lamps to transmit light to the liquid crystal display panel (not shown) increases, the number of lamp groups 57 can be changed and/or the number of lamps included in the lamp group 57 can be changed. Accordingly, the number of the inverter part 54, which generates the AC voltage of high voltage used in driving the lamps, can also be changed.

In this way, the lamp driving apparatus of the liquid crystal display device according to the embodiment of the present invention selectively supplies the AC voltage of high voltage generated at the n (n is an integer) inverters 541 to 54$n$ to the n (n is an integer smaller than m) lamp groups 571 to 57$n$ among the m (m is an integer bigger than n) lamp groups 571 to 57$m$ for one frame by use of the multiplexer 80, thereby driving the lamp formed at the lamp group 57. Because of this, the number of inverter parts 54, which generate the AC voltage of high voltage required for driving the lamp, become reduced, thereby reducing the cost of the liquid crystal display device.

As described above, the lamp driving apparatus of the liquid crystal display according to the embodiment of the present invention selectively supplies the AC voltage of high voltage generated at the n (n is an integer) inverters to the n (n is an integer smaller than m) lamp groups among the m (m is an integer bigger than n) lamp groups for one frame by use of the multiplexer, thereby driving the lamp formed at the lamp group 57. Because of this, the number of inverter parts, which generate the AC voltage of high voltage used for driving the lamp, is reduced, thus the cost of the liquid crystal display device can be reduced.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A lamp driving apparatus of a liquid crystal display device, comprising:
   m (m is an integer of at least 2) lamp groups each having a plurality of lamps;
   n (n is an integer smaller than m) inverter parts to generate an AC voltage of high voltage for driving the lamps;
   an inverter controller to control the inverter parts; and
   a multiplexer to selectively supply the AC voltage of high voltage generated at the n inverter parts to the n lamp groups among the m lamp groups.

2. The lamp driving apparatus according to claim 1, wherein the high voltage multiplexer comprises:
   a frequency divider to divide a clock signal generated from the inverter controller into a division signal; and
   a switch part to selective supply the AC voltage to the n lamp groups in accordance with the division signal and a switching control signal from the inverter controller.

3. The lamp driving apparatus according to claim 2, wherein the switch part comprises n switch array parts connected to the n inverter parts to supply the AC voltage to the n lamp groups in accordance with the switching control signal.

4. The lamp driving apparatus according to claim 3, wherein the switch array parts each comprise m switches each connected between the m lamp groups and one of the n inverter parts.

5. The lamp driving apparatus according to claim 2, wherein the switching control signal is comprised of m bits.

6. The lamp driving apparatus according to claim 1, wherein the inverter part comprises:
   a transformer to generate the AC voltage;
   a switch device part to supply a DC voltage to the transformer; and
   an inverter to drive the switch device part.

7. The lamp driving apparatus according to claim 6, wherein the inverter comprises:
   a drive signal generator to generate a drive signal for driving the switch device part;
   a feedback circuit to detect an output voltage of the transformer; and
   a switch controller to generate a control signal to control the driving of the switch device part on the basis of a feedback signal from the feedback circuit.

8. The lamp driving apparatus according to claim 6, wherein the switching device part includes:
   a first switch device part to supply a positive DC voltage to both ends of the transformer; and
   a second switch device part to supply a negative DC voltage to both ends of the transformer.

9. A method for driving a lamp of a liquid crystal display device having m (m is an integer of at least 2) lamp groups in each of which at least two lamps are disposed and n (n is an integer smaller than m) inverter parts to generate a drive voltage for driving the lamps, the method comprising:
   generating n drive voltages for driving the lamps;
   dividing a clock signal into m divided signals; and
   selectively supplying the n drive voltages to n lamp groups for one frame using the m divided signals, wherein m is an integer of at least 2 and n is an integer smaller than m.

10. The lamp driving method according to claim 9, wherein selectively supplying comprises:
    generating a switching control signal to selectively supply the n drive voltages to the n lamp groups; and
    connecting n inverters with the n lamp groups in accordance with the switching control signal.

11. The lamp driving method according to claim 10, wherein the switching control signal is comprised of m bits.

12. The lamp driving method according to claim 11, wherein the switching control signal has a value that is different from values of the remaining bits.

13. The lamp driving method according to claim 12, wherein the switching control signal has a value that is changed in accordance with the m divided signals.

14. The lamp driving method according to claim 9, wherein the selectively supplying comprises driving different sets of the m lamp groups for each divided signal in a particular frame.

15. The lamp driving method according to claim 14, wherein m−2 of the lamp groups maintain the same state between adjacent divided signals in the frame.

16. The lamp driving method according to claim 15, wherein each of the lamp groups having the same state are adjacent if the 1st lamp group is considered adjacent to the mth lamp group.

17. The lamp driving method according to claim 14, wherein each of the m lamp groups is driven n times each frame.

18. A lamp driving apparatus comprising:
   m (m is an integer of at least 2) lamp groups each containing a plurality of lamps;
   n inverter parts (n is an integer smaller than m) that each generate an AC voltage sufficient to drive the lamps of at least one of the lamp groups, fewer inverter parts being disposed in the lamp driving apparatus than lamp groups;
   an inverter controller that controls the inverter parts; and
   a multiplexer that selects different sets of lamp groups to be driven such that all of the lamp groups are driven for at least a portion of each frame.

19. The lamp driving apparatus according to claim 18, wherein each frame is divided into segments and each lamp group is driven for at least one segment each frame.

20. The lamp driving apparatus according to claim 19, wherein each lamp group is driven for n segments of each frame.

21. The lamp driving apparatus according to claim 19, wherein each frame is divided into m segments.

22. The lamp driving apparatus according to claim 21, wherein each lamp group is not driven for at least one segment each frame.

23. The lamp driving apparatus according to claim 18, wherein m−2 of the lamp groups maintain the same state between adjacent sets being driven in the same frame.

24. The lamp driving apparatus according to claim 23, wherein each of the lamp groups having the same state are adjacent if the 1st lamp group is considered adjacent to the mth lamp group.

25. The lamp driving apparatus according to claim 18, wherein the multiplexer comprises:
   a frequency divider that divides a clock signal from the inverter controller into a division signal, the division signal having a number of pulses in one clock pulse equal to the number of lamp groups;
   a switch part that selects to which lamp groups the AC voltage is supplied.

26. The lamp driving apparatus according to claim 25, wherein the switch part comprises n switch array parts connected between the inverter parts and the lamp groups, the switch array parts to supply the AC voltage generated at the inverter parts to the lamp groups in accordance with a switching control signal.

27. The lamp driving apparatus according to claim 26, wherein the switch array parts each comprise m switches, each switch connected between the lamp groups and one of the inverter parts.

* * * * *

UNITED STATES PATENT AND TRADEMARK OFFICE
CERTIFICATE OF CORRECTION

PATENT NO. : 7,183,722 B2  Page 1 of 1
APPLICATION NO. : 11/153006
DATED : February 27, 2007
INVENTOR(S) : Eui Yeol Oh et al.

It is certified that error appears in the above-identified patent and that said Letters Patent is hereby corrected as shown below:

On the Title Page

Column 1, line 1, under "Foreign Application Priority Data", delete "10-2004-0101552" and substitute --P2004-101552-- in its place.

Signed and Sealed this

Twenty-sixth Day of February, 2008

JON W. DUDAS
*Director of the United States Patent and Trademark Office*